Aug. 12, 1958

J. L. PETTUS 2,847,626

MOTOR CONTROL SYSTEM

Filed Oct. 8, 1954

INVENTOR.
JAMES L. PETTUS
BY
*J. L. Whittaker*
ATTORNEY

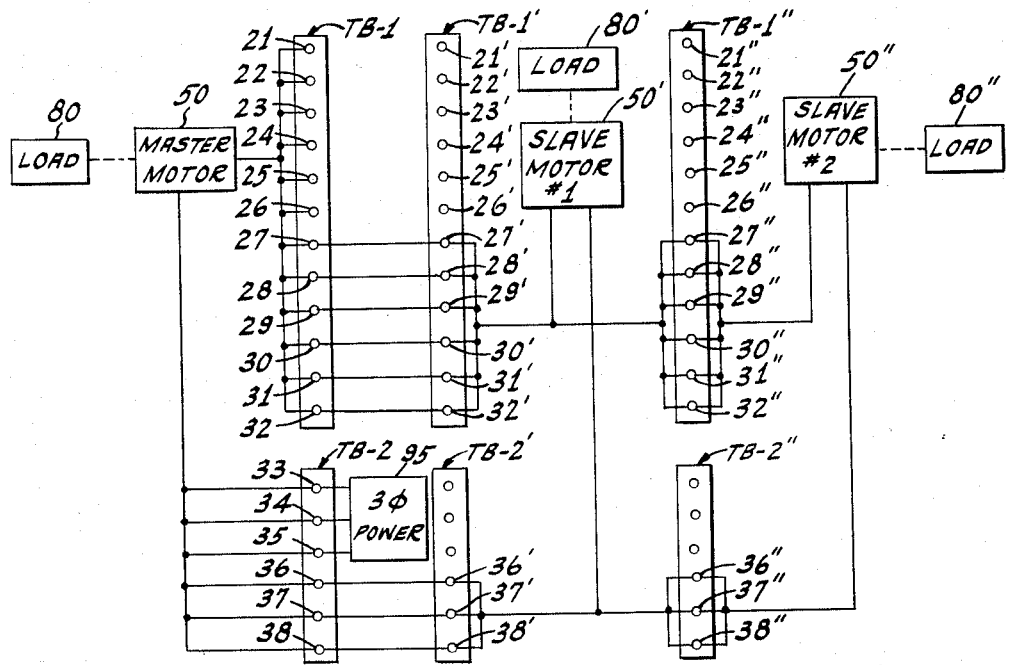
Fig. 2.
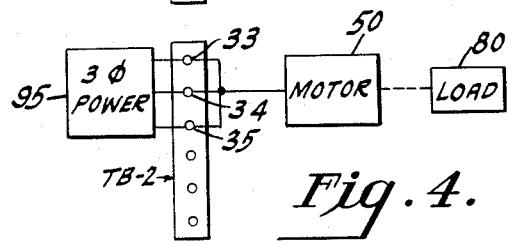
Fig. 4.
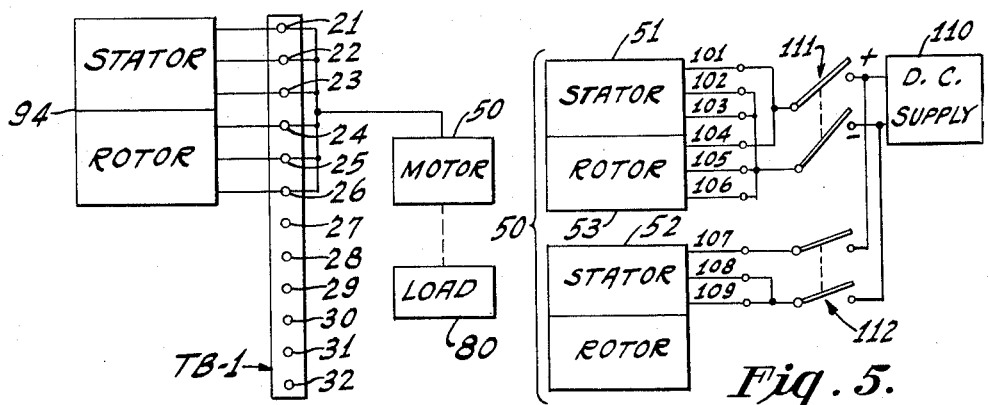
Fig. 3.
Fig. 5.
INVENTOR.
JAMES L. PETTUS
BY
ATTORNEY

INVENTOR.
JAMES L. PETTUS

United States Patent Office 2,847,626
Patented Aug. 12, 1958

2,847,626

MOTOR CONTROL SYSTEM

James L. Pettus, Encino, Calif., assignor to Radio Corporation of America, a corporation of Delaware Application October 8, 1954, Serial No. 461,059

7 Claims. (Cl. 318—42)

The present invention relates to an improved system for motor control and, in particular, to an improved system for electrically interlocking a plurality of motors and driving them in synchronism over a range of speeds.

In many industries it is often desirable to drive a plurality of loads in synchronism from standstill to operating speed and vice versa. For example, in the sound recording and moving picture industries it is often necessary simultaneously to make or reproduce two or more sound records or films or to combine several records in still another record. In such cases the several records (or films) are started from a standstill reference in exact synchronization and then accelerated to their normal operating speeds, maintaining exact synchronization at all times. When the records or films are stopped they must be slowed down in exact synchronization.

Prior arrangements of the above type commonly include so-called Selsyn or interlock systems. In such systems a master distributor driven by a separate motor whose acceleration and operating speed is controlled furnishes an electrical interlock to a plurality of motors. Other systems, referred to as "synchros," "auto syns," etc. have similar modes of operation.

In conventional distributor-slave plural motor systems, of the above type, the master distributor motor must have sufficient power not only to control the load connected thereto but also, to an extent, have sufficient power to control the load connected to all slave motors. This requires the master motor to be larger in physical size and power capacity than the slave motors. Moreover, the master motor is then limited to one particular unit, and likewise, remaining motors are limited to operation as slave motors by reason of their more limited power capacity.

It is an object of the present invention to provide an improved system for electrically interlocking a plurality of motors and driving them in synchronism over a range of speeds.

It is another object of the present invention to provide an improved motor control system capable of a plurality of different modes of operation and which may readily be operated in any one of the modes.

It is still another object of the present invention to provide an improved motor control system which may be operated as an electrically interconnected master-slave system of motors, or a system of motors interlocked to a separate distributor, or a system in which any one of the motors may be operated in synchronism with respect to the main power source.

Yet another object of the present invention is to provide an improved motor control system wherein control of a plurality of motors may be effected from any motor position.

Still another object of the present invention is to provide a plural motor arrangement capable of operating in synchronism over a range of speeds wherein all motors may be of the same relatively small electrical and physical size.

In a typical embodiment of the present invention each drive motor of the plural motor system includes a pair of independent stators, and a rotor including two independent, mechanically interconnected rotor elements. One of the stators provides an interlocking torque for maintaining all drive motors in synchronism at all speeds and the other stator provides the prime moving power for the loads connected to the different drive motors.

Switch means are provided at each motor location which determine the mode of motor operation. In one form of the invention, any one of the motor positions may be made the master motor control position and all motors controlled from this position. When power is applied to the motor at the master position, switch and relay means electrically interconnect corresponding stators and rotors of all motors and cause the motors to operate in synchronism with one another.

In a preferred embodiment of the present invention the switch means, when moved to a second position permit one or more of the plurality of motors to be operated from a separate master distributor, and when moved to a third position permit synchronous operation of any individual motor from a main power source.

The invention will be described in greater detail by reference to the following description taken in connection with the accompanying drawings in which:

Fig. 2 is a block diagram of the motor control system of the present invention interconnected for operation with one motor position as the master position and all other motor positions as slave positions;

Fig. 3 is a block diagram of the motor control system of the present invention interconnected for operation from a separate master distributor;

Fig. 4 is a block diagram of the motor control system of the present invention connected for operation of one of the motors in synchronism with the main power source:

Fig. 5 is a block diagram of a driving motor connected for electrical alignment of the two independent rotors thereof.

Similar reference characters are applied to similar elements throughout the drawings.

Figure 1:
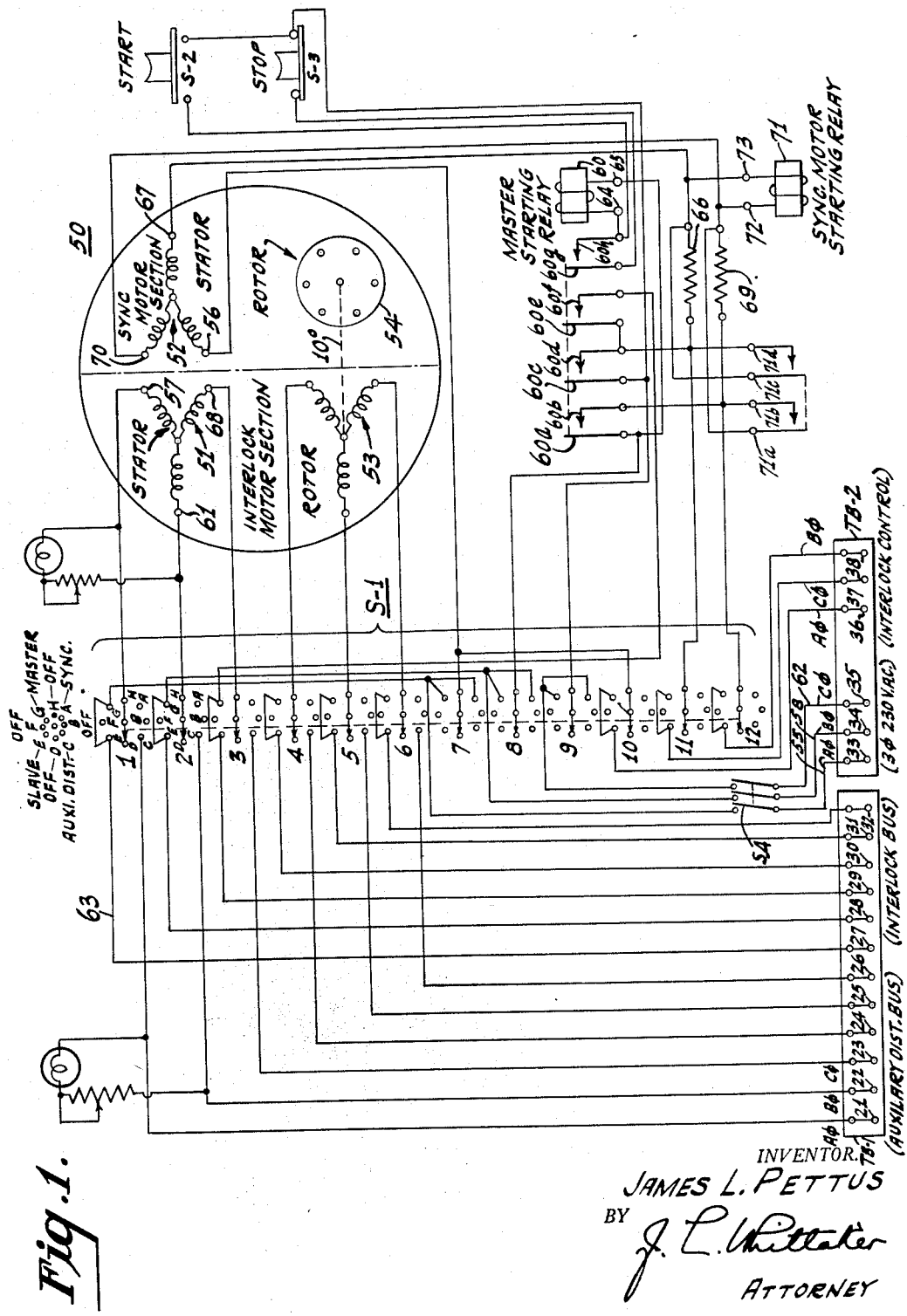
Fig. 1 is a schematic circuit diagram of a typical embodiment of the present invention showing only one of the motors of the plurality of motors.

Referring now to Fig. 1, the drive motor 50 is a combination "synchronous-interlock" motor and includes an interlock motor section consisting of stator 51 and wound rotor 53 and a synchronous motor section consisting of stator 52 and squirrel-cage rotor 54. The two sections of the drive motor are electrically independent of each other but have a common rotor shaft 100 and a common frame. The drive motor may be formed, for example, by mounting a six-pole synchronous motor and a four-pole induction motor on a common base and mechanically coupling their respective shafts together. Combining the two motors in a single frame and with a common rotor shaft is advantageous from the standpoint of size and appearance.

For a given motor frame size, the characteristics of either the synchronous motor section or the interlock motor section of the drive motor may be altered by changing the respective design values of the motors. According to the present invention the interlock motor section is designed to produce a substantially larger torque than the synchronous motor section. This is to permit the interlock motor sections to maintain the synchronous motor sections of the plural motor system in strict time-phase relationship, as will be described more fully below.

The respective poles of the interlock and synchronous sections of the combination drive motor must be properly oriented to prevent one motor section bucking or opposing the other. This is accomplished by mechanically and electrically aligning the stators and rotors of each section.

Figure 5 will aid in understanding the electrical alignment procedure outlined below. The motor sections are illustrated in block form, stator 51 and rotor 53 comprising the interlock motor section and stator 52 and rotor 54 comprising the synchronous section.

In the alignment procedure, the laminations of the wound rotor section are pressed onto the rotor shaft in any geometrical position, with the slots in the laminations aligned. The squirrel-cage rotor of the synchronous motor is then oriented so that the center of one synchronous pole is in line with the center of one interlock pole of the wound rotor. This completes the mechanical assembly of the rotors, except for assembling the coils on the wound rotor. The laminations of the stators are similarly aligned and placed into the motor housing. Following this, the center of the coil for the first phase stator winding of the synchronous motor section is oriented to agree with the center of one coil of the stator winding of the interlock motor section.

Following the above procedure there should be at least one point of coincidence between the respective poles of the two sections of the combination motor. If the respective coils of each stator winding are properly identified during the alignment procedure, it is entirely possible to end up with both sections of the motor correctly phased and in mutual relationship. However, in practice a slightly different procedure may be used.

Referring now to Fig. 5, one stator lead and one rotor lead of the interlock motor section are connected through switch 111 to the positive terminal of a direct current source 110. The remaining stator and rotor leads 102, 103, 105 and 106 are connected through the switch to the negative terminal of the D. C. source. When the circuit is closed, the rotor will assume a given position by reason of magnetic flux orientation. Switch 111 is then opened and one of the stator leads 107 of the synchronous motor section connected through switch 112 to the positive terminal of the D. C. source. The remaining stator leads 108, 109 are connected through switch 112 to the negative terminal of the D. C. source. When switch 112 is closed the rotor will assume a given position. If the windings are connected in the same time-phase relationship, the two given positions will agree. If they do not, new plus and minus leads are selected on the synchronous stator until the connections are correct for proper rotor indexing.

In some cases, it may be necessary to rephase the interlock section by selecting a different plus lead for the interlock rotor, or in other words, by changing lead 104 to the minus and one of leads 105 or 106 to the plus side of the D. C. source. In operation, the direction of rotation is then controlled by interchanging the minus leads 102 and 103, and 104 and 106 (or 104 and 105) to the interlock motor section, and the minus leads 108 and 109 to the synchronous motor section leaving the plus leads fixed with respect to the power source.

Referring again to Fig. 1, the mode of motor operation is determined by the 12 bank, eight position, ganged switch S–1, which includes a master, synchronous, auxiliary distributor, slave and four off positions. For the sake of drawing simplicity, the letters A–H are applied only to the contacts or terminals of bank 1. It is to be understood that corresponding contacts of the other banks carry corresponding identifying letters.

Assume that switch S–1 is in the G or master position and switch S–4 is closed connecting three phase power from terminals 33, 34, 35 of terminal board TB–2. In the following discussion, the three different phases are termed A, B and C phases, respectively.

A phase power is applied from terminal 33 and lead 55 to contact G of switch bank 7. Since the switch is in the master position, this phase is applied to terminal 56 of stator 52. This phase is also applied to contact G of switch bank 1 and thence to terminal 57 of stator 51. Finally, A phase power is applied to contact H of switch bank 10 and thence to terminal 36 of terminal board TB–2.

B phase power is applied over lead 58 to contact G of bank 8 and thence to movable contact 60a of relay 60. This relay is in its unenergized position. B phase power is also applied to contact G of bank 2 and thence to terminal 61 of stator 51.

C phase power is applied over lead 62 to contact G of bank 9 and thence to one side of start switch S–2 (upper right-hand corner of Figure 1).

The terminals (not shown) of the other motors of the system are connected to corresponding terminals of terminal boards TB–1 and TB–2. Switch S–1 of all other motors is in the slave position. It is seen that when switch S–4 is closed at the master unit, A and B phase power is applied to motor stator winding terminals corresponding to 57, 61 and 56 in all motors. Thus, A phase power is applied from contact E of bank 1 over lead 63 to terminal 27 of terminal board TB–1 to the other interlock stators. B phase power is applied from terminal 61 through contact E of bank 2 to terminal 28 of terminal board TB–1 to the other interlock stators. Finally, A phase power is applied from terminal 56 through contact E of bank 10 to terminal 36 of terminal board TB–2 to the other synchronous stators.

After switch S–4 at the master motor position is closed, start switch S–2 is depressed. This switch is biased and tends to return to its open position. When the start switch is closed, C phase power is applied from the right terminal thereof to terminal 64 of relay 60. B phase power from terminal G of switch bank 8 is already present on terminal 65 of the relay. Therefore, depressing start button S–2 energizes relay 60 causing the movable arms or "swingers" thereof 60a, 60c, 60e and 60g to contact fixed contacts 60b, 60d, 60f and 60h, respectively. The relay is prevented from being released by a holding voltage circuit from relay contacts 60h and g through normally closed, biased stop switch S–3.

Energization of relay 60 causes C phase power to be applied from contact G of bank 9 through movable contact 60c, fixed contact 60d, and resistor 66 to terminal 67 of synchronous stator 52. It also applies C phase power through movable contact 60c, fixed contact 60d, movable contact 60e, fixed contact 60f, and contacts G and H of switch bank 3 to terminal 68 of interlock motor stator 51. Thus, the latter now has power applied to all three terminals thereof.

Finally, energization of relay 60 causes B phase power to be applied from contact G of bank 8 through movable contact 60a, fixed contact 60b and resistor 69 to terminal 70 of synchronous stator 52. Thus, synchronous motor stator 52 now has three phase power applied thereto.

Resistors 66 and 69 are employed to reduce the voltage to the synchronous section of the drive motor. This is to reduce the starting or accelerating torque and thereby prevent jerky acceleration. The time they are in circuit is determined by relay 71 which, in effect, is a time delay relay, the timing action of which is determined by the design of its coil sensitivity in relation to its moving armature. The time delay is sufficient for the synchronous motor to accelerate to a speed synchronous with the power frequency. After sufficient back electromotive force is built up in stator 52, sufficient voltage is developed at terminals 70 and 67 respectively which are connected to relay terminals 72 and 73 respectively to actuate the relay. Actuation of relay 71 and closing of contacts 71a, b short out resistor 69 and similarly, closing of contacts 71c, 71d short out resistor 66.

If the circuit is traced further, it will be seen that when relay 60 is actuated, A phase power is applied from contact E of switch bank 10 to terminal board TB-2 terminal 36; B phase power is fed from contact E of switch bank 12 to terminal board TB-2 terminal 38; and C phase power is fed from contact T of bank 11 to terminal board TB-2 terminal 37.

Now if connections are made from terminals 36, 37 and 38 of terminal board TB-2 to corresponding terminals of the slave motor it is desired to drive in synchronism with the master motor, the synchronous motor stators of all slave drive motors are energized with three phase power. This power is provided via relay 60 of the master control circuit. Start-switch S-2 and stop-switch S-3 at the master motor position are the master controls for the entire plural motor system. The function of the start-switch S-2 has already been described. Stop-switch S-3, when depressed, breaks the holding circuit of relay 60. Relay 60 is active only at the master unit.

In a similar manner, connection of terminal boards TB-1 of a plurality of slave units to corresponding contacts on terminal board TB-1 of the master unit provides three phase voltages for the interlock motor stator of each slave unit and connects the rotor of each slave unit in parallel with the rotor of the master motor.

In the system of the present invention connected in the manner described, a plurality of like motors are electrically interlocked and driven in synchronism at all operating speeds. As already indicated, the interlock motor section of each drive motor is designed to develop substantially more torque than the synchronous motor section thereof. In starting and during acceleration to operating speed this relatively large amount of torque controls the operation of the synchronous motor sections by brute force.

When synchronous speed is achieved, the synchronous motor section is locked to the power line frequency and the interlock motor section serves no purpose. However, if at any time the load of a drive motor should exceed the capacity of its synchronous motor section rotor displacement results and the interlock motor section then produces sufficient additional torque again to place that drive motor in synchronism with the others.

When the stop button is depressed, single phase interlock between the respective interlock motor section stators is retained since the A and B phases of the power line remain connected across the interlock stators and all rotors remain interconnected. Therefore, the interlock motor sections cause all motors to slow down and stop in synchronism.

In an embodiment of the invention actually constructed each motor was connected to drive a load of approximately 20 mechanical watts. The motors were of relatively small size, each being on the order of 175 mechanical watts power in the interlock section and 75 mechanical watts power in the synchronous section.

One important advantage of the above system is that all motors may be of the same size. One of the reasons is that there is an equal load on each motor unit. The synchronous motor acts as a prime mover for its load, and the interlock motor serves to control the synchronous motor during starting and stopping and during periods when the load exceeds the capacity of the synchronous motor.

Another important advantage of the above-described arrangement is that control of the system may be located at any of the motors. The start and stop switches and relays at the controlling or master motor position control the system operation.

Fig. 2 is a block diagram of a system operating in the manner described above and includes a master motor 50 and a pair of slave motors 50', 50". The master motor has already been described in detail. The slave motors 50' and 50" may be identical to the master motor. Each motor drives its own load 80, 80' and 80", respectively. The rotors and stators of the master motor are connected through switch S-1 (omitted from Figure 2 for the sake of drawing simplicity) to the terminals of terminal board TB-1 and terminal board TB-2 in the manner already described in detail. The rotors and stators of the slave motors 50' and 50" are also connected to their terminal boards TB-1' and 2' and TB-1" and 2", respectively, through their switches S-1' and S-1", respectively. As in the case of the master motor system, the switches S-1' and S-1" are not shown in Figure 2. For simplicity of illustration, throughout Fig. 2 single leads are shown joining a plurality of leads, it being understood that these single leads designate multi-conductor cables. Switch S-1 of the master motor is in the master position and switches S-1' and S-1" of the slave motors are in the slave position.

In operation, corresponding terminals 21–38 of terminal boards TB-1 and TB-2 of all motors may be interconnected. However, since when in the slave position, any leads from terminals 21—26 of terminal board TB-1 are open-circuited at the slave terminal boards, these are not shown. Similarly, since switch S-4 (Fig. 1) at the master motor is the only one closed, leads between terminals 33, 34 and 35 of terminal board TB-2 and corresponding slave terminals are also open-circuited at the slave terminals and are therefore not shown. When the start switch at the master motor is depressed, three phase power from the interlock stator 51 of the master motor is applied from terminals 27, 28 and 29, respectively, to corresponding terminals 27', 28', 29' and 27", 28" and 29" of the two slave motors. The rotor of the master motor is connected to terminals 30, 31 and 32 of terminal board TB-1 to the corresponding terminals 30', 31' and 32' and 30", 31" and 32" and rotors of the two slave motors. Finally, three phase power from the synchronous stator 52 is applied through terminals 36, 37 and 38 of terminal board TB-2 to corresponding terminals 36', 37', 38' and 36", 37", 38" of the corresponding terminal boards of the slave motors. Thus, synchronous operation of all motors is achieved.

Figure 6:
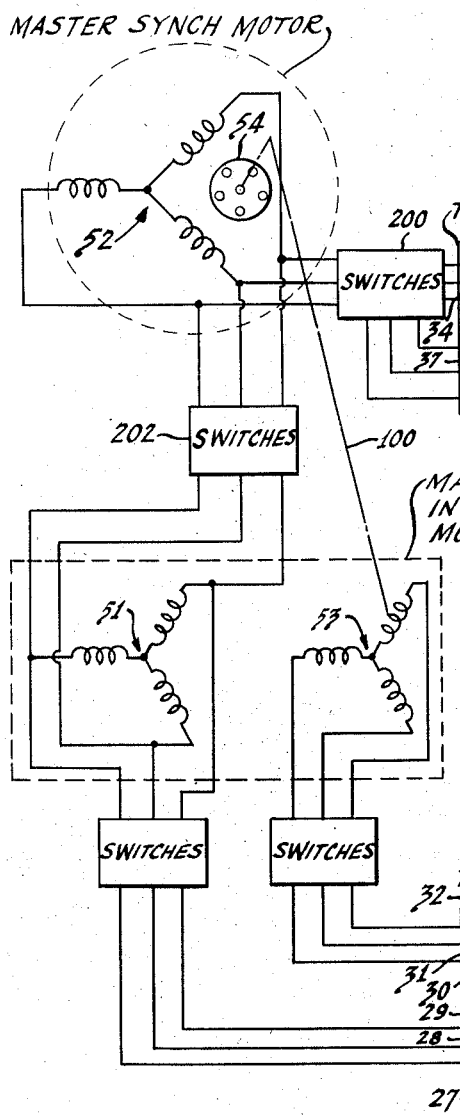
Fig. 6 is a block and schematic circuit diagram similar to the one of Fig. 2 but showing certain components in greater detail.
Figure 6:
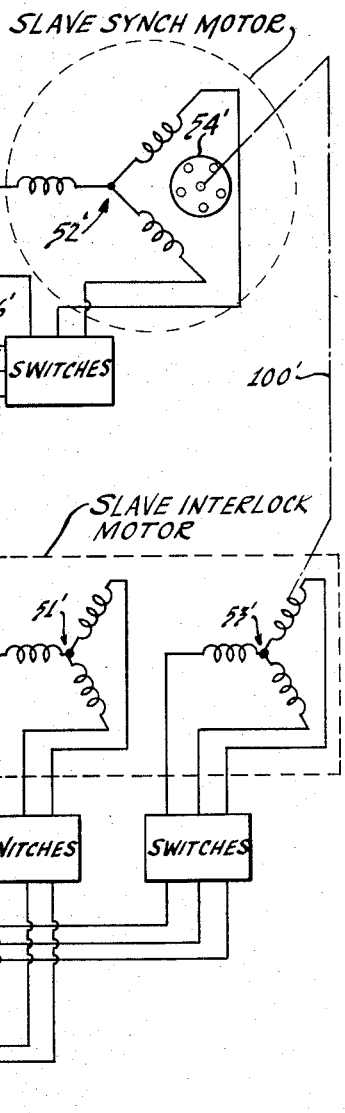

The purpose of Fig. 6 is to show in somewhat greater detail than Fig. 2 and in somewhat less detail than Fig. 1, the manner in which a master and slave motor of the present system may be interconnected. To facilitate the understanding of the diagram, in many cases several switches and the like are indicated by a single block. The term "switches" applied to the various blocks is meant to be generic, and to cover not only portions of switch banks such as S-1 but, in addition, the contacts of relays, push buttons and the like. As an example, block 200 includes switch S-4 and banks 7, 8 and 9 of switch S-1. Switch 202 includes banks 1, 2 and 3 of switch S-1 and other switches. In view of the fact that the interconnection between the various units has already been given in detail, it is believed that Fig. 6 and its legends are self-explanatory.

Fig. 3 illustrates the mode of operation wherein one or more drive motors may be operated from an auxiliary master distributor 94 which includes a stator and rotor. In this mode of operation, S-1 (Fig. 1) is thrown to the synchronous position. Three phase power from the stator of the distributor is applied to terminals 21, 22 and 23 of terminal board TB-1 and thence to the interlock stator 51 of motor 50, as may be seen from Fig. 1. Similarly, three phase power is applied from the rotor of the distributor via terminals 24, 25 and 26 to the two section rotor 53, 54 of the motor. Connections 28—32 respectively, as well as all connections on terminal board TB-2, are now open-ended. Likewise, all connections to the synchronous motor are open-ended. The control circuit including relays 60, 71 and switches S-2 and S-3 are inoperative. When connected in the manner described, operation of the interlock motor is suitable for use with the conventional distributor interlock system. A plurality of motors may be interlocked with the distributor by connecting their terminal boards TB-1', TB-1", etc. in parallel to TB-1.

If desired to operate one of the motors simply as a synchronous motor, it is merely necessary to throw switch S–2 to the synchronous position and connect to terminals 33, 34 and 35 a source of three phase power 95 as shown in Fig. 4. When so connected, the power source is connected only to the synchronous section of the motor 50 through the control circuit including switches S–2 and S–3 and relays 60 and 71. In this mode of operation, all connections to TB–2 are open-ended at switch S–2 and the former therefore is effectively out of the circuit.

I claim:

1. A motor control system comprising, in combination, a plurality of drive motors, each motor including a three-phase synchronous motor section having a stator and a rotor, and an independent, three-phase induction motor section developing a substantially larger torque than said synchronous motor section, said induction motor section including a rotor mechanically connected to the rotor of said synchronous motor section, and a stator; connection means for a source of three-phase power; first switch means for connecting the connection means for two of the phases of said power to the stator of one of said induction motor sections; second switch means for connecting, in parallel, all synchronous motor section stators, all induction motor section stators, and all induction motor section rotors; and third switch means for connecting the connection means for the third phase of said power to the stator of said one induction motor section, and the connection means for the three-phases of said power to the stator of said synchronous motor section.

2. A motor control system as set forth in claim 1, and further including stop-switch means for disconnecting the connection means for one phase of said power from the stator of said one induction motor section and at least the connection means for two of the phases of said power from the stators of said one synchronous motor section, whereby said drive motors slow down in synchronism to standstill, said induction motor sections providing an interlocking torque maintaining said drive motors in synchronism during deceleration and stopping them in synchronism.

3. A motor control system as set forth in claim 1, and further including means for disconnecting the connection means for said source of three-phase power from all of said drive motors; connection means for a master distributor having a stator and a rotor; and means for electrically interconnecting the connection means for the stator and rotor of said master distributor to the stator and rotor, respectively, of at least one induction motor section; whereby said one induction motor section may be driven in synchronism with said master distributor.

4. A motor control system as set forth in claim 1 and further including switch means for disconnecting all of said induction motor sections from the connection means for said source of three-phase power; and means for connecting at least one of said synchronous motor sections to the connection means for said source of three-phase power, whereby said synchronous motor section may be driven as a conventional synchronous motor from said source power.

5. A motor control system as set forth in claim 1, and further including circuit means between the connection means for said source of power and the stator of said one synchronous motor section for substantially reducing the electrical power applied to said stator section during the period required for the latter to attain synchronous speed.

6. A motor control system as set forth in claim 5, said circuit means including resistor means between the connection means for said source of power and said stator of said one synchronous motor section and relay means connected to be actuated by the back electromotive force built up across said last-named stator as the latter accelerates to synchronous speed for shorting out said resistor means when said motor reaches synchronous speed.

7. A system for interlocking a plurality of three-phase synchronous motors and driving them in synchronism at all speeds comprising, in combination, a three-phase interlock motor for each of said synchronous motors, each said interlock motor developing a substantially larger torque than its corresponding synchronous motor, and each said interlock motor including a rotor mechanically connected to the rotor of said synchronous motor, and a stator; means for electrically interconnecting in parallel the stators and rotors of all of said interlock motors and the stators of all of said synchronous motors, whereby when the source of power is applied to the stator of one of said synchronous motors and the stator of the corresponding interlock motor all of said synchronous motors are driven from standstill to operating speed in synchronism, and means for disconnecting one phase of said power from the stators of said interlock motors and at least two phases of said power from the stators of said synchronous motors, whereby said synchronous motors slow down in synchronism to standstill, said interlock motors providing an interlocking torque maintaining said synchronous motors in synchronism during deceleration and stopping them in synchronism.

References Cited in the file of this patent

UNITED STATES PATENTS

| | | |
|---|---|---|
| 2,074,129 | Nowacki | Mar. 16, 1937 |
| 2,232,255 | Myles | Feb. 18, 1941 |